(12) United States Patent
Matthews et al.

(10) Patent No.: US 9,809,294 B2
(45) Date of Patent: Nov. 7, 2017

(54) HIGH ALTITUDE BALLOON WITH ALTITUDE CONTROL

(71) Applicant: NORTHROP GRUMMAN SYSTEMS CORPORATION, Falls Church, VA (US)

(72) Inventors: Taylor Evan Matthews, San Diego, CA (US); Anthony Paul Fry, San Diego, CA (US); Jessica Marie Lavigne, San Diego, CA (US); Rafy Uddin Athar, San Diego, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 47 days.

(21) Appl. No.: 14/862,466

(22) Filed: Sep. 23, 2015

(65) Prior Publication Data
US 2017/0081012 A1    Mar. 23, 2017

(51) Int. Cl.
*B64B 1/40* (2006.01)

(52) U.S. Cl.
CPC .................................... *B64B 1/40* (2013.01)

(58) Field of Classification Search
CPC .. G05D 1/042; B64B 1/40; B64B 1/58; B64B 1/44; B64B 1/62; B64B 1/50; B64B 1/64; B64B 2201/00; B64D 47/08
See application file for complete search history.

(56) References Cited

U.S. PATENT DOCUMENTS

| | | | | |
|---|---|---|---|---|
| 573,549 | A | * 12/1896 | St. Croix | B64B 1/40 244/96 |
| 3,094,246 | A | 6/1963 | Fazio et al. | |
| 3,170,658 | A | * 2/1965 | Yost | B64B 1/62 244/98 |
| 3,220,671 | A | * 11/1965 | Ashman | B64B 1/62 126/674 |
| 3,366,345 | A | * 1/1968 | Pohl | B64B 1/40 244/2 |
| 3,432,122 | A | 3/1969 | Flickinger et al. | |
| 3,614,031 | A | * 10/1971 | Demboski | B64B 1/62 244/138 R |
| 4,174,082 | A | * 11/1979 | Eshoo | B64B 1/58 244/31 |
| 4,215,834 | A | * 8/1980 | Dunlap | B64B 1/62 244/97 |
| 4,262,864 | A | * 4/1981 | Eshoo | B64B 1/58 126/577 |
| 4,597,633 | A | * 7/1986 | Fussell | G03B 21/56 352/69 |
| 4,758,199 | A | * 7/1988 | Tillotson | A63H 27/10 244/31 |

(Continued)

OTHER PUBLICATIONS

"Aerostar Continued Airworthiness Instructions for Aerostar (Raven) Hot Air Balloons", Aerostar international, 2013.*

(Continued)

*Primary Examiner* — Assres H Woldemaryam
(74) *Attorney, Agent, or Firm* — McNair Law Firm, P.A.

(57) ABSTRACT

A high altitude balloon including a balloon film, a lifting gas disposed within the balloon film, a payload operably coupled to the balloon film, and a heat transfer element operably coupled between the payload and the balloon film configured to transfer heat from the payload to the lifting gas causing a change in buoyancy of the high altitude balloon.

19 Claims, 3 Drawing Sheets

(56) References Cited

U.S. PATENT DOCUMENTS

| | | | | |
|---|---|---|---|---|
| 5,104,060 | A * | 4/1992 | Brotz | B64B 1/58 244/31 |
| 5,967,459 | A * | 10/1999 | Hayashi | B64B 1/06 244/152 |
| 6,010,093 | A * | 1/2000 | Paulson | B64B 1/50 244/24 |
| 6,182,924 | B1 * | 2/2001 | Nott | B64B 1/44 244/61 |
| 7,341,224 | B1 * | 3/2008 | Osann, Jr. | B64C 39/028 244/30 |
| 8,091,826 | B2 | 1/2012 | Voorhees | |
| 8,156,669 | B2 * | 4/2012 | Maj | G09F 21/06 244/31 |
| 9,463,863 | B1 * | 10/2016 | Roach | B64B 1/58 |
| 2007/0014125 | A1 * | 1/2007 | Chu | F21V 3/023 362/565 |

OTHER PUBLICATIONS

Jones et al. "Montgolfiere Balloon Missions for Mars and Titan".*
WaybackMachinefor prior art date for "Montegolifiere Balloon Mission for mars and Titan" document.*

* cited by examiner

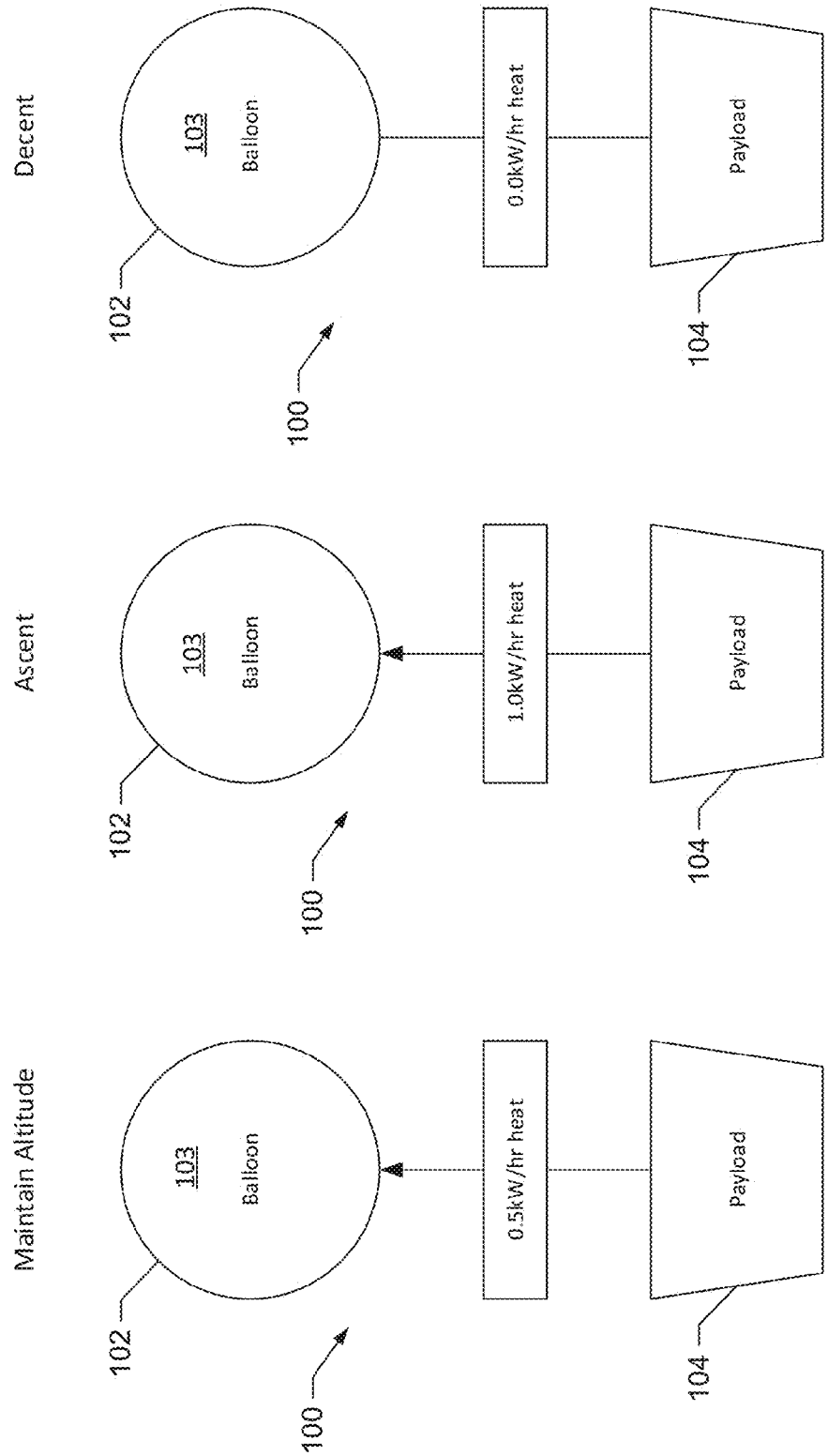

HIGH ALTITUDE BALLOON WITH ALTITUDE CONTROL

TECHNICAL FIELD

Example embodiments generally relate to high altitude balloons and, in particular, relate to a high altitude balloon with altitude control.

BACKGROUND

High altitude systems, such as high altitude aircraft, satellites, and high altitude balloons may be used for a variety of applications including high altitude scientific experiments, communications, surveillance, or the like. In some instances, it may be desirable to maintain a relatively stable altitude in an area of interest for an extended period, e.g. greater than 24 hours. Satellites may be capable of maintaining a static altitude over an area of interest for the extended period, but are extremely expensive, and the altitude may be higher than desired, e.g. about 1,000,000 ft. High altitude aircraft may be capable of achieving a lower altitude; however, they too are very expensive and cannot hover over the area of interest. Additionally, both satellites and high altitude aircraft are easily detectable, which may be detrimental for military applications. Typical high altitude balloons offer a cheaper alternative than satellites or high altitude aircraft, are capable of relatively low altitudes, e.g. 60,000 ft to 120,000 ft, and can hover over an area of interest. However, such balloons may have a limited period during which the desired altitude may be maintained.

BRIEF SUMMARY OF SOME EXAMPLES

Accordingly, some example embodiments may enable the provision of a high altitude balloon, as described below. In one example embodiment, a high altitude balloon is provided including a balloon film, a lifting gas disposed within the balloon film, a payload operably coupled to the balloon film, and a heat transfer element operably coupled between the payload and the balloon film to transfer heat from the payload to the lifting gas causing a change in buoyancy of the high altitude balloon.

In another example embodiment, an altitude control device is provided including a heat sink configured to be operably coupled to a payload of a high altitude balloon, and a radiator configured to be operably coupled to and disposed within a balloon film of the high altitude balloon. The heat sink is configured to transfer heat from the payload to the radiator and the radiator is configured to radiate the heat to lifting gas disposed within the balloon film to cause a change in buoyancy of the high altitude balloon.

BRIEF DESCRIPTION OF THE SEVERAL VIEWS OF THE DRAWING(S)

Having thus described the high altitude balloon in general terms, reference will now be made to the accompanying drawings, which are not necessarily drawn to scale, and wherein:

FIGS. 3A-3C illustrate example heat transfer diagrams according to an example embodiment.

DETAILED DESCRIPTION

Figure 1:
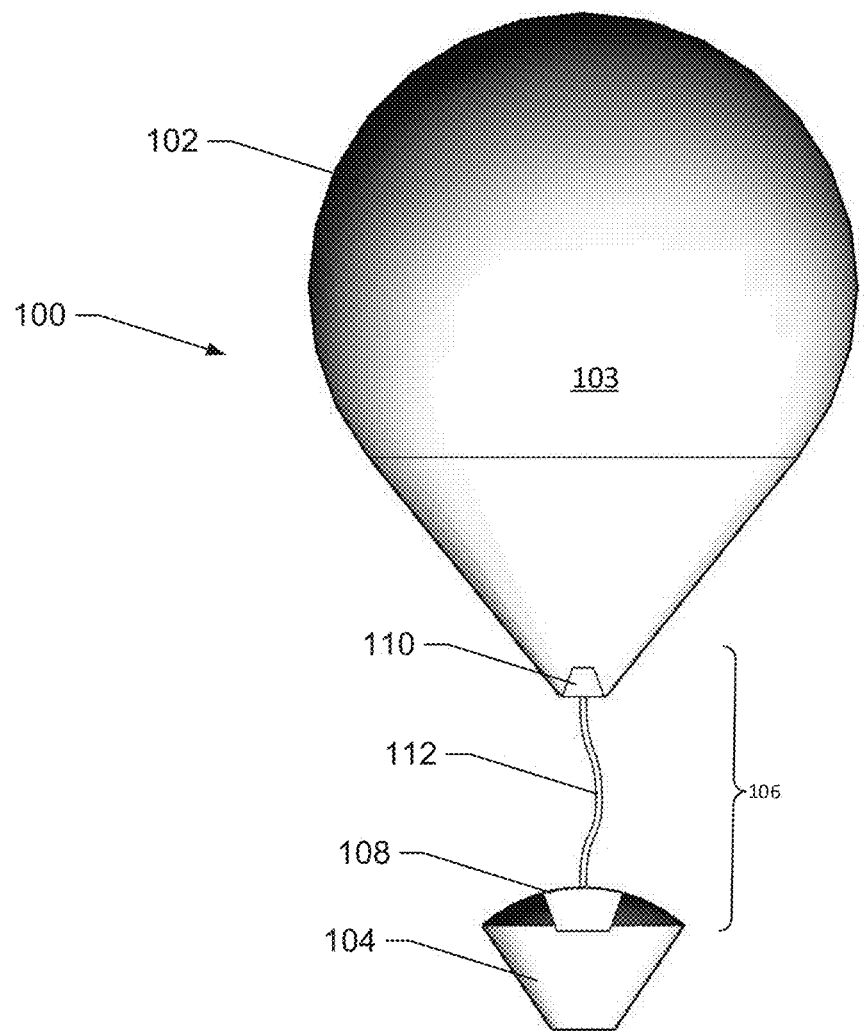
FIG. 1 illustrates a high altitude balloon with a heat transfer element according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

In an example embodiment, a high altitude balloon may be provided with a heat transfer element configured to transfer the waste heat of the payload, such as produced by electronic equipment, to lifting gas within the balloon film. The heat transfer element may provide a heat sink for heat produced by the electrical components and increase the flight time of the balloon.

In some embodiments, the heat transfer element includes a regulator to allow or inhibit the heat transfer. The regulation of the heat transfer may allow for altitude control through regulation of the temperature of the lifting gas.

Example High Altitude Balloon

An example embodiment of the high altitude balloon will now be described in reference to FIG. 1. FIG. 1 illustrates a high altitude balloon 100 with a heat transfer element 106 according to an example embodiment. The high altitude balloon 100 may include a balloon film 102, a payload 104, and the heat transfer element 106.

The balloon film 102 may be a thin plastic film, such as polyethylene. The balloon film 102 may have a thickness of about $1/3000^{th}$ to $1/10000^{th}$ of an inch. The balloon film 102 may be filled with a lifting gas 103 and cinched, plugged, tied, or otherwise sealed. The lifting gas 103 may provide positive buoyancy to the high altitude balloon 100. The lifting gas 103 may be any gas which is lighter than air, such as hydrogen, helium, methane, ammonia, or the like. The high altitude balloon 102 may be configured to operate at an altitude of about 60,000 ft to about 120,000 ft. Although high altitude balloons are typically operated at an altitude of 60,000 ft to 120,000 ft one of ordinary skill in the art would immediately appreciate that a balloon with altitude control may be configured to operate at altitudes greater-than 120,000 ft or less-than 60,000 ft, depending on the desired application. The operating altitude may be dependent on the volume of the lifting gas 103, which may in turn be dependent on the volume of the balloon film 102. The volume of the lifting gas 103 may be selected to cause lift sufficient to cause ascension of the high altitude balloon 100 and the payload 104 to the selected altitude.

The payload 104 may be an electronic device including one or more electronic components, such as processors, antennas, resistors, transistors, or the like, which may creates heat when in operation. In an example embodiment, the payload 104 may be communications equipment, navigation equipment, environmental sensors, surveillance systems, weapons systems, or the like. The payload 104 may be operably coupled to the balloon film 102 by a tether, cable, or the like, suspended below the balloon film 102. In some example embodiments, the tether may be a coolant pipe 112, as discussed below.

The heat transfer element 106 may include a heat sink 108 and a radiator 110. The heat sink 108 may be configured to absorb or conduct heat from the payload 104. In an example embodiment, the heat sink 108 may be operably coupled to one or more electronic components of the payload 104, which produce heat during operation. The heat sink 108 may transfer the heat to the radiator 110. In an example embodiment, the radiator 110 may be disposed within the balloon film 102. The radiator 110 may be a surface configured to absorb or conduct the heat from the heat sink 108 and transfer the heat to the lifting gas 103.

In an example embodiment, the heat sink 108 may directly transfer the heat to the radiator, such as in an instance in which the heat sink 108 is a base plate, e.g. a metallic base plate, operably coupled to the payload 104 and the radiator 110 is one or more fins configured to conduct heat away from the base plate.

In some example embodiments, the heat transfer element 106 also includes a coolant pipe 112. The coolant pipe 112 may be operably coupled, such as fluidly connected to the heat sink 108 and the radiator 110. The coolant pipe 112 may be filled with a fluid with a low freezing temperature, such as a hydrocarbon based cryogenic coolant or propylene glycol/water solution. In some instances the fluid may have a freezing temperature as low as −129 C. The coolant pipe 112 may be formed of Teflon, or other suitably flexible and durable material.

In an example embodiment, the heat sink 108 may be a liquid cooled heat exchanger and the radiator 110 may be a liquid gas heat exchanger. The coolant pipe 112 may allow for circulation of the fluid between the heat sink 108 and the radiator 110, which conveys the heat from the heat sink 108 to the radiator 110, as discussed below in reference to FIG. 2.

The transfer of heat away from the payload 104 may improve the performance of the payload 104 by reducing heat stresses on the electronic components. Radiating the heat to the lifting gas 103 by the radiator 110 may increase the buoyancy of the high altitude balloon, as described in reference to FIGS. 3A-3C.

In an example embodiment, the high altitude balloon 100 may include more than one balloon film 102. A first balloon film 102, and lifting gas 103 disposed within, may provide a constant amount of lift to the high altitude balloon 100, and a secondary balloon film 102 may include the heat transfer element and same or different lifting gas 103, to provide altitude control for the high altitude balloon 100 as discussed herein. In some example embodiments it may be advantageous for the second balloon film 102 to include thermal or insulation properties different than the first balloon film 102 for thermal considerations, such as heat loss of the lifting gas 103.

Figure 2:
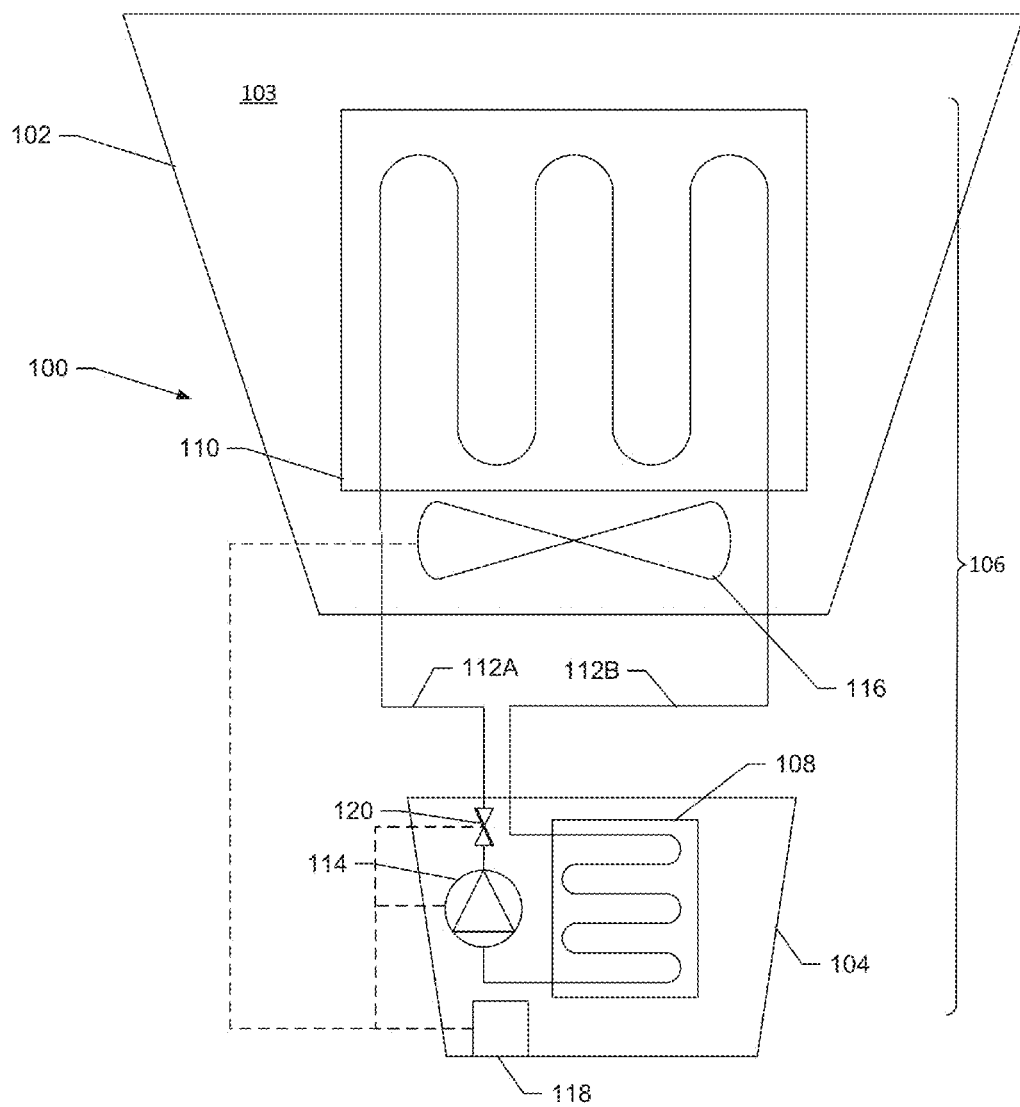
FIG. 2 illustrates an example block diagram of a high altitude balloon with a heat transfer element according to an example embodiment.

FIG. 2 illustrates an example block diagram of the high altitude balloon 100 with the heat transfer element 106 according to an example embodiment. The heat transfer element 106 may include the heat sink 108, the radiator 110, and coolant pipe 112. The fluid in coolant pipe 112 may provide heat transfer between the heat sink 108 and the radiator 110. The heat sink 108 may absorb heat from one or more electrical components of the payload 104. The heat may be conveyed through heat exchanger walls of the heat sink 108 to the fluid in a riser coolant pipe 112B. The heat transferred to the fluid may decrease the density of the fluid in the riser coolant pipe 112B, causing the fluid to flow, by natural circulation into the radiator 110. The heat may be transferred from the fluid to a surface of the radiator 110, such as a cooling fin, The transfer of the heat out of the fluid and into the radiator 110 may increase the density of the fluid causing the coolant to descend through a down corner coolant pipe 112A, returning to the heat sink 108.

The lifting gas 103 may circulate within the balloon film 102. The lifting gas 103 may absorb the heat from the radiator 110 thereby causing the lifting gas 103 to expand, which may increase the total volume of the lifting gas 103 and cause the lifting gas 103 to rise in the balloon film 102. Lifting gas 103 which is cooler, such as near the top of the balloon film 102, may be displaced by the heated lifting gas 103, toward the radiator 110, through natural circulation.

The heat transfer to lifting gas 103 may increase the buoyancy of the high altitude balloon 100. In an example embodiment, heat transfer of about 0.00011 kW may increase lift by about 7.5 percent for a balloon film with a volume of 4 ft$^3$. The heat transfer to lift ratio may be dependent on the volume of the balloon film 102. In some example embodiments, a change in lifting gas 103 temperature of about 8 degrees Celsius may cause an increase in lift of about 3 percent.

In some embodiments, the rate of heat transfer may be increased by increasing the mass flow rate of the fluid, such as by using a fluid pump 114. Additionally or alternatively, the rate of heat transfer may be increased by increasing the mass flow rate of the lifting gas 103, such as by using a fan 116.

In some example embodiments, heat transfer may be arrested or throttled by stopping or adjusting flow of the fluid in the coolant pipe 112A, 112B, such as by adjusting or shutting a coolant valve 120.

In an example embodiment, the heat transfer element 106 may include a regulator 118. The regulator 118 may be configured to enable or inhibit heat transfer from the heat sink 108 and to lifting gas 103. In an example embodiment, the regulator 118 may be configured to enable heat transfer or increase heat transfer by energizing the fluid pump 114 and/or the fan 116. The regulator 118 may inhibit or decrease heat transfer by reenergizing the fluid pump 114 and/or the fan 116. Additional or alternatively, the regulator 118 may initiate heat transfer by opening coolant valve 120. The regulator 118 may adjust the mass flow rate of the fluid by adjusting the position of the coolant valve 120, or stop flow of the fluid by shutting the coolant valve 120.

In some example embodiments, the regulator 118 may enable, inhibit, or adjust the heat transfer rate based on predetermined conditions, such as altitude, elapsed time, or the like. Some examples are discussed in reference to FIGS. 3A-3C.

FIGS. 3A-3C illustrate example heat transfer diagrams according to an example embodiment. Initially the balloon film 102 may be filled with a volume of lifting gas 103 and released. The high altitude balloon 100 may ascend to the desired altitude, such as 80,000 ft. In some embodiments, the balloon film 102 may be a "zero pressure" or a "constant volume" balloon. As the pressure exerted on the exterior surface of the balloon film 102 decreases as altitude increases, a relief valve may be configured relive excess pressure, e.g. the internal pressure greater than the external pressure, of the balloon film 102. The relief valve may relieve the excess pressure by expelling a portion of the lifting gas 103. By maintaining a zero pressure differential across the balloon film 102, the balloon film 102 may be kept at a constant volume and prevent damage to the balloon film 102. Additionally, the volume of the balloon film 102 may determine the altitude of the high altitude balloon 100.

The lifting gas 103 may lose heat to the environment, through the balloon film 102, which may in turn cause an increase in density and a decrease in lifting gas 103 volume. Additionally or alternatively, some lifting gas 103 may be lost due to diffusion through the balloon film. 102, which may cause a decrease in the lifting gas 103 volume. As discussed, the volume of the lifting gas 103 in the balloon film 102 may determine the altitude of the high altitude balloon 100, as such the decrease in lifting gas 103 volume by heat loss or diffusion may cause the high altitude balloon 100 to descend from the desired altitude.

The high altitude balloon 100 may be configured to transfer heat from the payload 104 to the lifting gas 103 in the balloon film 102, via the heat transfer element 106 discussed above, in reference to FIGS. 1 and 2. In an example embodiment, the regulator 118 may be configured to maintain an altitude or altitude band, such as 80,000+/− 1000 ft. The regulator 118 may maintain altitude by elapsed time, current altitude, such as determined by a payload altimeter, or the like.

FIG. 3A depicts an example embodiment in which the regulator 118 transfers heat from the payload 104 to the lifting gas 103 to maintain a desired altitude. In an example embodiment in which regulator 118 maintains altitude by elapsed time, the regulator 118 may control the heat transfer rate for a first predetermined period of time, such as 22 hours, for maintaining the desired altitude, such as 0.5 kW/hr. Similarly, in an instance in which the regulator 118 determines the desired altitude has been obtained, such as 80,700 ft, the regulator 118 may set the heat transfer rate to maintain the desired altitude. The heat transfer rate may be controlled to cause the balloon to be neutrally buoyant or have a slight negative buoyancy, such as 8 kilograms. Thus, by controlling the heat transfer from the heat sink 108 to the lifting gas 103, a significantly longer flight time may be possible due to compensating for the lifting gas 103 losses discussed above.

In an example embodiment, the regulator 118 may be configured to cause the high altitude balloon 100 to ascend or descend, such as based on an elapsed time, current altitude, or the like, by controlling the heat transfer rate. The slight negative buoyancy of some embodiments, may allow for a slow descent of the high altitude balloon 100 to the bottom of a desired altitude band, such as 79,000 ft in the example above. Meanwhile, to cause an ascent, as depicted in FIG. 313, the regulator 118 may increase the heat transfer, from the payload 104 to the lifting gas 103 in the balloon film 102, such as 1.0 kW for a second predetermined period of time, such as 1 hour, or until a predetermined altitude is obtained, such as 80,900 ft.

In an example embodiment in which the regulator 118 controls heat transfer rate based on elapsed time, the regulator 118 may increase the heat transfer rate, to cause the high altitude balloon 100 to ascend, upon a determination of expiration of the first predetermined time period. In an example embodiment in which the regulator 118 controls the heat transfer rate based on current altitude, the regulator 118 may increase the heat transfer, in an instance in which the altimeter measures a current altitude at or below a low set point, e.g. 79,000 ft. The ascent heat transfer may be maintained for the second predetermined period of time or until a high set point is reached, such as 80,900 ft. The increased heat transfer rate may cause the high altitude balloon 100 to have a positive buoyancy, such as 10 kilograms, and rise.

In some instances, the regulator 118 may be further configured to stop or inhibit heat transfer to cause a descent of the high altitude balloon 100, such as based on elapsed time, current altitude, or the like, as depicted in FIG. 3C. The descent may allow the high altitude balloon 100 to use a larger portion of the altitude band Or correct for altitude ascension overshoots.

In an example in which the regulator 118 controls the heat transfer based on elapsed time, the regulator 118 may stop or inhibit heat transfer, from the payload 104 to the lifting gas 103, after the second predetermined period, such as 1 hour, has elapsed. Similarly, in an instance in which the regulator 118 determines a high altitude set point has been attained or exceeded, such as 80,900 ft, the regulator 118 may stop or inhibit the heat transfer from the payload 104 to the lifting gas 103 to cause the high altitude balloon 100 to have a negative buoyancy, such as 6 kilograms. Thus, the regulator 118 may maintain the high altitude balloon 100 in the desired altitude band, until the balloon film 102 is damaged, the lifting gas 103 is depleted, or the flight is terminated. The descent heat transfer rate may be maintained by the regulator 118 for a third predetermined period of time, such as 1 hour, or until the desired altitude is measured on decent, e.g. 87,000 ft, after which the regulator 118 may control the heat transfer rate for maintaining the desired altitude as discussed above in reference to FIG. 3A.

In some embodiments, the high altitude balloon 100 may be further configured for optional modifications. In this regard, for example, the heat transfer element includes a heat sink operably coupled to the payload to absorb the heat from the payload. In some example embodiments, the heat transfer element also includes a radiator operably coupled to the balloon film and disposed within the balloon film to radiate the heat to the lifting gas. In an example embodiment, the payload is an electronic device. In some example embodiments, the heat is generated by the electronic device. In an example embodiment, the heat transfer element includes a regulator configured to enable or inhibit the heat transfer between the payload and the lifting gas. In some example embodiments, the heat transfer element includes a heat sink operably coupled to the payload to absorb the heat from the payload, a radiator operably coupled to the balloon film and disposed within the balloon film configured to radiate the heat to the lifting gas, and a coolant pipe filled with a fluid operably coupled between the heat sink and the radiator. The fluid transfers the heat from the heat sink to the radiator. In an example embodiment, the heat transfer element also includes a fluid pump configured to circulate the fluid between the heat sink and the radiator. In some example embodiments, the heat transfer element also includes a regulator configured to cause and stop operation of the fluid pump. In an example embodiment, the radiator includes a liquid/gas heat exchanger and a fan configured to circulate the lifting gas within the balloon film. In some example embodiments, the heat transfer element also includes a regulator configured to cause and stop operation of the fan.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring device s are not to be limited to the specific embodiments disclosed and that modifications and other embodiments are intended to be included within the scope of the appended claims. Moreover, although the foregoing descriptions and the associated drawings describe exemplary embodiments in the context of certain exemplary That which is claimed:

1. A high altitude balloon comprising:
   a balloon film;
   a lifting gas disposed within the balloon film;
   a payload operably coupled to the balloon film, the payload generating waste heat during operation of the payload; and
   a heat transfer element operably coupled between the payload and the balloon film configured to transfer the waste heat from the payload to the lifting gas causing a change in buoyancy of the high altitude balloon;
   wherein the payload is an electronic device, and wherein the waste heat is generated by the electronic device.

2. The high altitude balloon of claim 1, wherein the heat transfer element comprises:
   a heat sink operably coupled to the payload to absorb the waste heat from the payload.

3. The high altitude balloon of claim 2, wherein the heat transfer element further comprises:
   a radiator operably coupled to the balloon film and disposed within the balloon film to radiate the waste heat to the lifting gas.

4. The high altitude balloon of claim 1, wherein the heat transfer element includes a regulator configured to selectively control the heat transfer between the payload and the lifting gas to provide altitude control for the high altitude balloon.

5. A high altitude balloon comprising:
   a balloon film;
   a lifting gas disposed within the balloon film;
   a payload operably coupled to the balloon film; and
   a heat transfer element operably coupled between the payload and the balloon film configured to transfer heat from the payload to the lifting gas causing a change in buoyancy of the high altitude balloon, wherein the heat transfer element comprises:
      a heat sink operably coupled to the payload to absorb the heat from the payload;
      a radiator operably coupled to the balloon film and disposed with the balloon film to radiate the heat to the lifting gas; and
      a coolant pipe filled with a fluid operably coupled between the heat sink and the radiator,
   wherein the fluid transfers the heat from the heat sink to the radiator.

6. The high altitude balloon of claim 5, wherein the heat transfer element further comprises a fluid pump configured to circulate the fluid between the heat sink and the radiator.

7. The high altitude balloon of claim 6, wherein the heat transfer element further comprises a regulator configured to cause and stop operation of the fluid pump.

8. The high altitude balloon of claim 5, wherein the radiator comprises:
   a liquid/gas heat exchanger; and
   a fan configured to circulate the lifting gas within the balloon film.

9. The high altitude balloon of claim 8, wherein the heat transfer element further comprises a regulator configured to cause and stop operation of the fan.

10. An altitude control device comprising:
    a heat sink operably coupled to a payload of a high altitude balloon; and
    a radiator operably coupled to and disposed within a balloon film of the high altitude balloon,
    wherein the heat sink is configured to transfer waste heat generated by operation of the payload to the radiator and the radiator is configured to radiate the waste heat to lifting gas disposed within the balloon film to cause a change in buoyancy of the high altitude balloon.

11. The altitude control device of claim 10 further comprising:
    a regulator configured to selectively control the heat transfer between the heat sink and the radiator to provide altitude control for the high altitude balloon.

12. The altitude control device of claim 10, wherein the payload is an electronic device, and wherein the waste heat is generated by the electronic device.

13. The altitude control device of claim 10, further comprising:
    a coolant pipe filled with a fluid, the coolant pipe being operably coupled between the heat sink and the radiator, wherein the fluid transfers the waste heat from the heat sink to the radiator.

14. The altitude control device of claim 13 further comprising:
    a fluid pump configured to circulate the fluid between the heat sink and the radiator.

15. The altitude control device of claim 14 further comprising:
    a regulator configured to cause and stop operation of the fluid pump.

16. The altitude control device of claim 14, wherein the radiator comprises:
    a liquid/gas heat exchanger; and
    a fan configured to circulate the lift gas within the balloon film.

17. The altitude control device of claim 16 further comprising a regulator configured to cause and stop operation of the fan.

18. The high altitude balloon of claim 1, wherein the payload comprises communications equipment, navigation equipment, environmental sensors, surveillance systems, or weapons systems and wherein the electronic device that generates the waste heat during operation of the payload is a component of the communications equipment, navigation equipment, environmental sensors, surveillance systems, or weapons systems.

19. The altitude control device of claim 10, wherein the payload comprises communications equipment, navigation equipment, environmental sensors, surveillance systems, or weapons systems and wherein an electronic device that generates the waste heat during operation of the payload is a component of the communications equipment, navigation equipment, environmental sensors, surveillance systems, or weapons systems.

\* \* \* \* \*